UNITED STATES PATENT OFFICE.

ISAAC LIFSCHÜTZ, OF GRÜNAU, NEAR BERLIN, GERMANY.

VIOLET-RED DYE.

SPECIFICATION forming part of Letters Patent No. 500,917, dated July 4, 1893.

Application filed September 8, 1892. Serial No. 445,380. (Specimens.)

*To all whom it may concern:*

Be it known that I, ISAAC LIFSCHÜTZ, doctor of philosophy, a subject of the Czar of Russia, residing at Grünau, near Berlin, in the Kingdom of Prussia and Empire of Germany, have invented new and useful Improvements in the Manufacture of Coloring-Matters, of which the following is a specification.

Already in 1870 Liebermann published the observation that by treating anthraquinone simultaneously with nitric and sulphuric acids, coloring matter is obtained. In this reaction the first product is nitro-anthraquinone which by the action of sulphuric acid is converted into the coloring matter (See *Berichte der Deutschen Chemischen Gesellschaft* 3, 905). This reaction was further investigated by the same chemist (*ibid*, 4, 231) and almost simultaneously by Boettger and Petersen (*ibid*, 4, 229). Later on Liebermann and Hagen resumed the investigation of this reaction which led to the production of a large number of compounds. They treated dinitro-anthraquinone (in the impure form then alone accessible to chemists and likely containing mono-nitro-anthraquinone) with concentrated sulphuric acid and from their product isolated a coloring matter soluble in baryta water but did not examine or use the considerable portion of their product which is insoluble in that reagent (*ibid*, 15, 1801). In the year 1884 I investigated the same reaction and prepared from the resulting crude product several dyes. I described these under the names Dye I$a$, Dye I$b$, Dye II$a$, and Dye II$b$, in the above mentioned *Berichte*, Vol. 17, page 891 *et seq*. It is the dye I$b$, which forms the subject matter of the present application for Letters Patent.

The following description of my method of procedure will serve as an example to illustrate the manner in which my dye can be obtained and the invention carried into practical effect.

First, I treat pure ortho-dinitro-anthraquinone (the so-called 1, IV ortho-dinitro-anthraquinone) with concentrated sulphuric acid in the manner described by Liebermann and Hagen, that is to say, I mix together about twenty (20) to thirty (30) parts of pure dinitro-anthraquinone with about fifteen (15) times the weight of concentrated sulphuric acid and heat the mixture rapidly to about two hundred degrees centigrade (200° C.). When a vigorous reaction accompanied by the evolution of gas takes place, I remove the source of heat and resume heating when cooling sets in. The reaction is soon ended and on pouring into water the product is obtained as a brownish red precipitate. Next to obtain the particular dye which is useful (I$b$) from the complicated crude product so obtained I take the paste obtained by collecting and washing the above mentioned brownish red precipitate and dissolve it as far as possible in boiling caustic potash solution containing about two per cent. potassium hydrate (2 per cent. KOH). Any residue insoluble in boiling caustic potash solution as also the precipitate which forms on cooling contain little or none of the desired dye which is soluble in potash solution of the strength mentioned even when cold. After cooling therefore, I filter the solution which is of a deep violet color and add hydrochloric acid to the filtrate. A precipitate is obtained which contains the useful dye still mixed however with other coloring matter. The useful dye can be obtained in greater purity by extracting this precipitate repeatedly with alcohol. For this purpose I prefer to boil the product with a little alcohol, allow to cool and filter when cold. In this way, coloring matter more readily soluble in cold alcohol than the desired useful dye which is but slightly affected by that solvent, is extracted from it. Whatever impurities still remain in the dye do not materially affect the properties hereinafter set forth and are therefore immaterial to the scope of this patent.

The optical properties of the useful dye as revealed by spectroscopic examination, which are hereinafter fully described can be used as a guide in purifying the useful compound from its congeners.

This anthracene dye possesses the following properties: It is slightly soluble in cold water, more readily soluble in hot water. It is slightly soluble in alcohol, benzene and ether giving a red violet to red color and a yellow fluorescence. These latter solutions show an absorption spectrum which consists of two well defined strong lines in the green each of which is accompanied by one weaker line; further, some other weak lines.

The dye dissolves unchanged in concentrated sulphuric acid giving a deep blue violet solution showing a brownish-red fluorescence, and shows in its solution an absorption spectrum consisting of two deep dark broad bands one in yellow and one in green and an indication of a weak line in the red.

In alkalies the dye dissolves giving deep blue solutions. In the dry state, it occurs in the form of a dark colored powder which on rubbing shows a metallic sheen. From its alkaline solution it can be precipitated by the addition of hydrochloric acid in a red-brown flocculent form. It sublimes, partially decomposing, on heating giving violet fumes resembling the vapors of indigo which condense to needle like crystals. On heating with zinc dust it yields anthracene.

What I claim as new, and desire to secure by Letters Patent, is—

The dyestuff which can be obtained from dinitroanthraquinone and which when dry occurs in the form of a dark colored powder, slightly soluble in water, alcohol, benzene and ether, soluble in concentrated sulphuric acid and in alkalies. Its solution in concentrated sulphuric acid shows a deep blue-violet color and a brownish-red fluorescence. Its solution in alcohol, benzene and ether and also in sulphuric acid exhibit most characteristic absorption spectra all substantially as described.

In testimony whereof I have hereunto set my hand in the presence of two subscribing witnesses.

I. LIFSCHÜTZ.

Witnesses:
L. A. EDWARDS,
W. HAUPT.